July 31, 1962 T. A. O. GROSS 3,047,285
SEMI-ISOTHERMAL PNEUMATIC SUPPORT
Filed June 30, 1959

*INVENTOR.*
THOMAS A. O. GROSS
BY
ATTORNEYS

United States Patent Office 3,047,285
Patented July 31, 1962

3,047,285
SEMI-ISOTHERMAL PNEUMATIC SUPPORT
Thomas A. O. Gross, Concord Road, Lincoln, Mass.
Filed June 30, 1959, Ser. No. 824,127
10 Claims. (Cl. 267—65)

This invention relates to pneumatic load bearing devices, such as pneumatic tires, pneumatic springs and the like, which depend upon a gas under pressure to provide an elastic yielding support.

Pneumatic devices of this type are widely used to support a load with a cushioning action to protect it against shocks or jolts. Their operation is dependent largely upon the fact that the gas is compressible such that its volume may be reduced with an accompanying rise in pressure. A counter-acting factor generally encountered, however, is the temperature rise accompanying the compression by which the pressure is raised disproportionately to the volume decrease and in excess of the pressure that would be developed under isothermal conditions.

The present invention provides a pneumatic load bearing device in which the temperature rise accompanying compression is minimized or otherwise controlled so that any given volume change is accompanied by a smaller pressure change. Conversely, in the pneumatic load bearing devices of this invention, a given pressure change, due for instance to a sudden shock, is effected with a greater volume change than in similar devices presently known. The result is a softer support, or greater cushioning action, which when applied to pneumatic tires gives a ride that is much smoother, and when applied to pneumatic springs gives greater compliance to sudden displacements, and a reduced resonant frequency of oscillation.

In general, the invention consists in providing a solid material which serves as a thermal reservoir, or heat sink, intimately distributed substantially throughout the volume of gas in an amount such that its total heat capacity (mass times specific heat) is sufficiently large in relation to the total heat capacity of the gas to reduce the temperature changes normally accompanying compression and expansion through the exchange of heat between it and the gas. Accordingly the solid material is preferably distributed to present a large extended surface in intimate heat exchange relation with the gas such that the rate of heat exchange is sufficient to maintain the temperature of the gas substantially constant during compression and expansion. By virtue of this exchange, volume changes which are normally adiabatic may occur substantially isothermally.

The amount of the solid material will depend chiefly on the desired degree to which the temperature of the gas is to be held constant, and the distribution of the solid material will depend chiefly on the rate at which heat is to be exchanged. Where less than maximum temperature equalization is to be had, smaller amounts of solid material may be used and it may be distributed less extensively and with less surface available for heat exchange than when better temperature equalization is sought. Similarly, where the rate of compression or expansion is low, the distribution of the solid material and the surface available for heat exchange may be such that the rate of heat exchange is low, but where compression and expansion occur rapidly the surface must be large and so distributed throughout the gas that the rate of exchange occurs at a much higher rate. For significant results, however, the solid material should have a total heat capacity at least of the same order of magnitude as that of the gas.

Conditions under which cushion support of the type provided by pneumatic load bearing devices is effectively used generally include shocks and jolts producing rapid compressions and expansion, and it is with reference to such conditions that the preferred embodiments of this invention are described. In particular, the conditions encountered in providing pneumatic yielding support for vehicles are considered typical.

To realize best results the total heat capacity of the solid material is greater than the heat capacity of the gas, preferably more than five times the heat capacity of the gas, and is distributed such that substantially all the heat accompanying compression or expansion, for instance 75% or more, is exchanged within a time which is very short in relation to the duration of compression or expansion, typically less than about 10 milliseconds (0.01 seconds). To achieve this result, the heat sink is distributed to provide a surface for heat exchange in close proximity to substantially all of the inflating gas. Desirably the solid material is distributed so that at least 30%, and preferably at least 70%, of the volume or mass of gas is situated within a distance of 0.1 centimeter, and preferably within a distance of 0.05 centimeter, of the nearest portion of surface to which heat may be exchanged. In other words, the solid material should be so intimately distributed throughout the gas as to be effective to exchange heat with the gas, and one criterion is that the total space that surrounds the surface of the solid material within a distance of 0.1 centimeter should contain at least 30% of the gas. This space may be visualized as a layer 0.1 centimeter thick enveloping the fibers or particles of heat sink material.

Suitable solid materials will accordingly be any of a number of substances which may be formed with large surfaces and which have relatively high heat capacities and thermal conductivities. The material may, for instance, be fine fibers of glass, synthetic plastics, metal or other material having the necessary capacity, distributed in either a random or oriented manner throughout the gas, or it may be fine particles of the solid material dispersed throughout the gas to present the desired amount and distribution of surface. Cellular materials, such as solid foam substances having small, preferably open-walled, cells may also be used.

In arranging the solid material throughout the volume of gas, it is generally preferred that the solid material not interfere with the pneumatic support provided by the gas, and in particular the solid material need not function to bear any substantial part of the load.

Although numerous obvious ways of arranging and distributing the solid material throughout the gas may be used, the preferred methods consist in arranging fine fibers of solid material, such as glass or metal, in close parallel proximity, as by embedding their ends in a supporting base, and supporting them in this manner within the volume of gas. Another very suitable technique consists in suspending fine solid particles in the gas as by mechanical agitation. Both of these permit most effective utilization and distribution of the surface of the solid material, with an optimum amount of solid material such that an excessive fraction of the volume is not filled with solid material to the exclusion of gas. In this connection, while the heat capacity of the solid is desirably high in relation to the heat capacity of the gas, an excessive amount of solid material, for instance an amount providing a heat capacity in excess of 20 times the capacity of the gas, provides only slight additional benefit from absorbing additional heat, and that at the expense of occupying volume that would better be utilized if occupied by gas. Thus, as a practical matter, the solid material is not advantageously used in an amount such that its capacity is in excess of about 20 times that of the gas.

Typical embodiments of this invention as applied specifically to pneumatic tires and to a pneumatic spring are described below with reference to the accompanying drawing in which.

Figure 1:
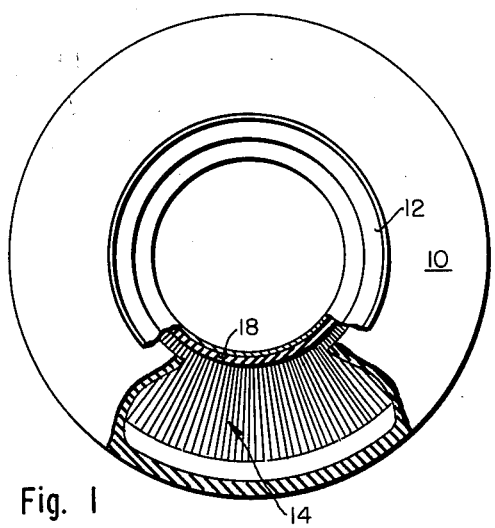
FIG. 1 is a view in side elevation showing a pneumatic tire embodying the invention, with portions cut away to reveal structural details.
Figure 2:
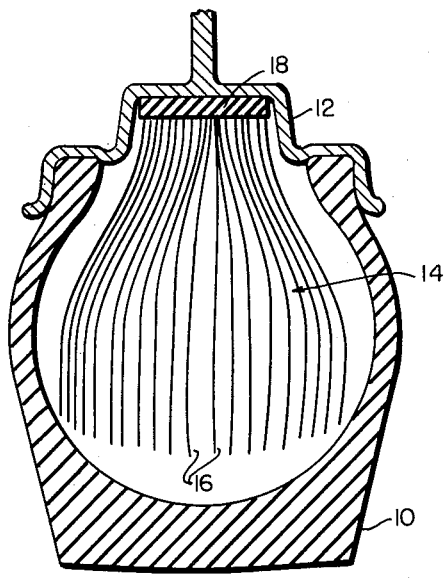
FIG. 2 is a cross-sectional view through the tire shown in FIG. 1.

A pneumatic tired vehicle embodying this invention is shown in FIGS. 1 and 2. The tire 10, preferably one of the common tubeless variety, is mounted in the usual manner to the wheel rim 12 about a preferred type of heat sink member 14 which provides an extended surface of solid material distributed substantially throughout the volume of the tire. The tire is inflated with air in the usual manner.

The heat sink member 14 consists of closely parallel glass fibers 16 having one of their ends held in a base band 18 which is wrapped around the wheel rim 12 to support the fibers in a generally radial array extending substantially through the space inside of the tire. The fibers 16 may be secured to the base band 18 by any of numerous well-known methods, for instance the base band 18 may be fabric to which the fibers 16 are attached in the manner of a deep pile. Alternatively, the base band may be of a molded plastic material such as rubber in which the ends of the fibers have been embedded.

The glass fibers are extremely fine and distributed in closely spaced relationship such that their total mass has a heat capacity of roughly about five times the capacity of the inflating gas, and the surface of the fibers is distributed throughout the gas and in intimate contact therewith so that the heat is substantially entirely exchanged within about 1 millisecond following a compression or expansion.

Glass fibers of size G (average diameter=0.001 cm.) packed at a density of 10,000 per sq. cm. are entirely suitable as the solid heat sink, providing under these conditions a heat capacity of about five times that of the inflating air and a distribution of surface such that the average maximum distance from any point within the array of fibers to a fiber surface is about .005 cm.

This arrangement of the heat sink fibers is particularly advantageous since the fibers are out of contact with the inner surface of the tread portion of the tire, and are held radially extended by the centrifugal force of the rotation of the wheel. Thus, the orientation and distribution of the fibers is held fairly well fixed without permanent dislocation or bunching, which would interfere with the optimal operation of the heat sink material.

The effect of providing a heat sink within a tire of this type is a noticeably smoother ride at any given static inflation pressure, since under compression and expansion from road surface irregularities, the volume change occurring is considerably greater than when air alone is used.

Figure 3:
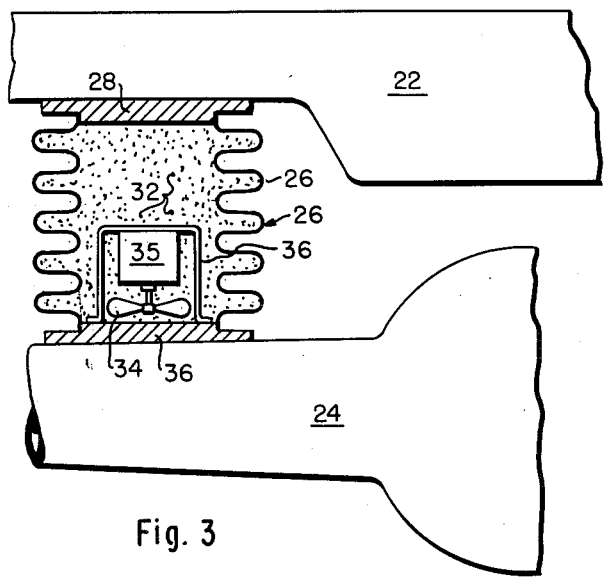
FIG. 3 is a schematic cross-sectional showing a preferred manner by which a pneumatic spring may be constructed in accordance with this invention.

In FIG. 3 is shown an embodiment of this invention as applied to a pneumatic spring 20 supporting a vehicle chassis 22 upon an axle 24. The spring 20 is shown as comprising a bellows 26, closed at both ends by cover members 28 and 30 which are secured respectively to the chassis 22 and axle 24. The solid heat sink material is distributed within the bellows 26 in the form of fine particles 32 of pulverulant solid material, the amount being sufficient to provide a heat capacity between about 1 and 20 times the heat capacity of the inflating gas, and the particle size being such that the material may be evenly suspended in the gas such that 30% or more of the volume of the gas is located within 0.1 cm. or less of particle surface.

Continuous suspension of the particles in the embodiment shown is provided by a fan 34 mounted within the bellows, and driven by a small electric motor 35 supported on an appropirate bracket 36.

In a spring of this type designed for use in vehicle suspension systems, a suitable solid material is powdered talc passing a 1000 mesh Tyler screen, in an amount of about 30 grams per liter of spring volume, for the case of air at 50 p.s.i.g. as the inflating gas.

Another satisfactory material is finely divided molybdenum sulfide, $MoS_2$, which is available as particles having an average size of the order of a micron, for instance the material designated "Molycoat" and sold by Alpha Corp., of Stamford, Connecticut.

Instead of suspended solid particles, the heat sink of a pneumatic spring, such as illustrated in FIG. 3, may be formed of flexible synthetic organic fibers loosely packed within the gas chamber. Commercial Dacron (polyester fibers manufactured by Du Pont) has been found to be particularly suitable. Its mechanical properties include a high modulus of elasticity and a non-pliable nature, and it is essentially non-hygroscopic. Noticeably improved results have been obtained by packing the pneumatic springs of a 1958 model Chevrolet, each with 80 grams of 50 denier Dacron pillow stuffing sold by Sears Roebuck (Cat. No. 24H8996).

Although specific dimensions relating to the distribution of solid material within the gas and to the heat transfer rates have been indicated as giving best results, the figures should not be taken as definitive of the invention in its broadest sense. In any case the distribution of solid material should provide for a rate of heat transfer which is related to the rate of compression and expansion and where the invention is to be used in a system subject to low rates of compression and expansion the pneumatic system may be designed for much lower rates of heat exchange. For instance, if the invention is to be used to reduce the resonant frequency of oscillation in an automobile suspension system, which is typically about 5 cycles per second, effective results will be realized if the solid heat sink material provides for substantial exchange of the heat accompanying compression and expansion within about .05 second, or one-quarter cycle.

The invention has been described in detail with specific reference to presently preferred embodiments, but it is contemplated that modifications will readily occur to those skilled in the art and familiar with this disclosure and that such may be made in applying the principles herein disclosed to meet particular applications, without departing from the scope of this invention.

This application is a continuation-in-part of applicant's copending application Serial No. 563,370, filed February 3, 1956, now abandoned.

Having thus disclosed my invention and described in detail preferred embodiments thereof, I claim and desire to secure by Letters Patent:

1. A load bearing traction member comprising a pneumatic tire inflated with a gas under pressure sufficient to support said load, a solid material distributed substantially throughout said gas and in intimate contact therewith, said material bearing substantially none of said load and having a total heat capacity which is at least about equal to but not more than about twenty times the total heat capacity of the gas and having a surface area distributed in intimate heat exchange relation with the gas such that the heat accompanying pressure and volume changes of the gas is exchanged with the solid material.

2. A load bearing traction member comprising a wheel rim, a pneumatic tire mounted on said wheel rim, a gas inflating said tire at a pressure sufficient to support the load, and a solid heat sink comprising fibers of solid material secured about said rim and substantially radially disposed within said tires, said fibers being in an amount such that their total heat capacity is at least about equal the total heat capacity of the mass of said gas and presenting a surface area distributed in intimate heat exchange relation with the gas.

3. The traction member defined by claim 2 in which the fibers are in an amount having a total heat capacity between about one and twenty times the total heat capacity of the gas, and are distributed such that at least 70% of the gas is located within 0.05 centimeter of fiber surface.

4. A suspension system for supporting a load subject to sudden shocks and jolts with a cushioning action to protect the load againt said shocks and jolts comprising a pneumatic spring subject to rapid compression and expansion, said spring including an enclosed substantially gas tight container having wall portions movable and effective to vary the volume of the container, a gas within said container under a pressure sufficient to support said wall portions under said load, and solid fibrous material dispersed substantially throughout said gas and in intimate contact therewith, said material bearing substantially none of said load and having a total heat capacity which is at least about equal to but not more than about twenty times the total heat capacity of the gas and having a surface area distributed in intimate heat exchange relation with the gas, so that the heat caused by pressure and volume changes of the gas is exchanged with the solid material.

5. An assembly as defined by claim 4 wherein said material is distributed in the gas such that at least 30% of the gas is situated within 0.1 centimeter of the nearest portion of solid surface of said material.

6. A suspension system for supporting a load subject to sudden shocks and jolts with a cushioning action to protect the load against said shocks and jolts comprising a pneumatic spring subject to rapid compression and expansion, said spring including a container having wall portions movable and effective to vary the volume of the container, a gas within said container under a pressure sufficient to support said wall portions under said load, and solid material within said container in intimate contact with said gas, said material bearing substantially none of said load and having a total heat capacity which is at least about equal to but not more than about twenty times the total heat capacity of the gas and having a surface area distributed in intimate heat exchange relation with the gas, so that the heat caused by pressure and volume changes of the gas is exchanged with the solid material.

7. An assembly as defined by claim 6 wherein said material is distributed in the gas such that at least 30% of the gas is situated within 0.1 centimeter of the nearest portion of solid surface of said material.

8. In a vehicular suspension system, a pneumatic spring comprising a container having wall portions movable and effective to vary the volume of the container, a gas within said container under a pressure sufficient to support said wall portions under the load of the vehicle, and solid fibrous material within said container in intimate contact with said gas, said material bearing substantially none of said load and having a total heat capacity which is at least about equal to but not more than about twenty times the total heat capacity of the gas and having a surface area distributed in intimate heat exchange relation with the gas, so that the heat caused by pressure and volume changes of the gas is exchanged with the solid material.

9. In a vehicular suspension system, a pneumatic spring comprising a container having wall portions movable and effective to vary the volume of the container, a gas within said container under a pressure sufficient to support said wall portions under the load of the vehicle, and solid flexible synthetic organic fibrous material within said container in intimate contact with said gas, said material bearing substantially none of said load and having a total heat capacity which is at least about equal to but not more than about twenty times the total heat capacity of the gas and having a surface area distributed in intimate heat exchange relation with the gas, so that the heat caused by pressure and volume changes of the gas is exchanged with the solid material.

10. In a vehicular suspension system, a pneumatic spring comprising a container having wall portions movable and effective to vary the volume of the container, a gas within said container under a pressure sufficient to support said wall portions under the load of the vehicle, and solid material within said container in intimate contact with said gas, said material bearing substantially none of said load and having a total heat capacity which is at least about equal to but not more than about 20 times the total heat capacity of the gas and having a surface area distributed in intimate heat exchange relation with the gas, so that the heat caused by pressure and volume changes of the gas is exchanged with the solid material.

References Cited in the file of this patent

UNITED STATES PATENTS

| | | |
|---|---|---|
| 569,566 | Pratt | Oct. 13, 1896 |
| 1,391,541 | Grant | Sept. 20, 1921 |
| 2,713,266 | Smith et al. | July 19, 1955 |
| 2,884,039 | Hicks | Apr. 28, 1959 |